United States Patent
Zhou

(10) Patent No.: US 10,044,556 B2
(45) Date of Patent: Aug. 7, 2018

(54) IDENTIFYING PERFORMANCE-DEGRADING HARDWARE COMPONENTS IN COMPUTER STORAGE SYSTEMS

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 14/747,208

(22) Filed: Jun. 23, 2015

(65) Prior Publication Data

US 2016/0380806 A1      Dec. 29, 2016

(51) Int. Cl.
 *H04L 12/24*      (2006.01)
(52) U.S. Cl.
 CPC ........ *H04L 41/0677* (2013.01); *H04L 41/069* (2013.01)
(58) Field of Classification Search
 CPC ............. H04L 41/0613; H04L 41/0659; H04L 41/0677
 See application file for complete search history.

(56) References Cited

U.S. PATENT DOCUMENTS

| | | | | | |
|---|---|---|---|---|---|
| 5,469,463 A | * | 11/1995 | Polich | ................. | G06F 11/2257 706/916 |
| 6,073,089 A | * | 6/2000 | Baker | ................. | G06F 11/0709 702/185 |
| 8,582,444 B2 | | 11/2013 | Zee et al. | | |
| 8,751,866 B2 | | 6/2014 | Gooding et al. | | |
| 2003/0212861 A1 | * | 11/2003 | Higaki | ................. | G06F 3/061 711/114 |

(Continued)

OTHER PUBLICATIONS

Orlando et al., "SAN Storage Performance Management Using Tivoli Storage Productivity Center", IBM® Tivoli®, ibm.com/redbooks, Third Edition, Sep. 2011, © Copyright International Business Machines Corporation 2009, 2011, pp. 1-412, <http://www.redbooks.ibm.com/redbooks/pdfs/sg247364.pdf>.

*Primary Examiner* — Scott B Christensen
*Assistant Examiner* — Lam Do
(74) *Attorney, Agent, or Firm* — Daneil R. Simek; Bryan D. Wells

(57) ABSTRACT

Performance-degrading hardware components in computer storage systems are identified. A timed-out input/output (I/O) operation is detected. Hardware components that include a plurality of types of hardware components involved with the timed-out I/O operation are identified. Involve counts of the hardware components are increased. A plurality of suspicious hardware components are identified based, at least in part, on a hardware hierarchy including one or more types of hardware components. There is at most one suspicious hardware component for each type of hardware component. A performance-degrading hardware component is identified from among the plurality of suspicious hardware components based, at least in part, on the involve counts and the hardware hierarchy. The performance-degrading hardware component is in a layer of the hardware hierarchy that is lower than layers including other suspicious hardware components.

20 Claims, 7 Drawing Sheets

(56) References Cited

U.S. PATENT DOCUMENTS

| | | | |
|---|---|---|---|
| 2006/0112220 A1* | 5/2006 | Otsuka | G06F 3/0613 |
| | | | 711/114 |
| 2008/0195369 A1* | 8/2008 | Duyanovich | G06F 11/0709 |
| | | | 703/22 |
| 2011/0231707 A1 | 9/2011 | Davenport et al. | |
| 2012/0047287 A1* | 2/2012 | Chiu | G06F 3/0605 |
| | | | 710/8 |
| 2012/0233310 A1 | 9/2012 | Agarwala et al. | |
| 2016/0092141 A1* | 3/2016 | Araki | G06F 3/0647 |
| | | | 711/165 |
| 2016/0378389 A1* | 12/2016 | Hrischuk | G06F 3/0631 |
| | | | 711/154 |

\* cited by examiner

| EXTENT | CEC | ENC | DA | HA | BAY |
|---|---|---|---|---|---|
| 0x0000 EXT 1 | CEC_0 | ENC_0 | DA_0 | 0 | BAY_0 |
| 0x0000 EXT 2 | CEC_0 | ENC_0 | DA_0 | 0 | BAY_0 |
| 0x0000 EXT 1 | CEC_0 | ENC_3 | DA_0 | 0 | BAY_0 |
| 0x0000 EXT 3 | CEC_0 | ENC_1 | DA_0 | 0 | BAY_0 |
| 0x0000 EXT 4 | CEC_0 | ENC_2 | DA_0 | 0 | BAY_0 |
| 0x0000 EXT 5 | CEC_0 | ENC_2 | DA_0 | 0 | BAY_0 |
| 0x0000 EXT 2 | CEC_0 | ENC_2 | DA_0 | 0 | BAY_0 |

| | TYPE | NUMBER | COUNT | SUSPICIOUS | | TYPE | NUMBER | COUNT | SUSPICIOUS |
|---|---|---|---|---|---|---|---|---|---|
| 0 | CEC | 0 | 7 | 1 | 25 | ENC | 0 | 2 | 0 |
| 1 | CEC | 1 | 0 | 0 | 26 | ENC | 1 | 1 | 0 |
| 2 | BAY | 0 | 7 | 1 | 27 | ENC | 2 | 3 | 0 |
| 3 | BAY | 1 | 0 | 0 | 28 | ENC | 3 | 1 | 0 |
| 4 | BAY | 2 | 0 | 0 | 29 | ENC | 4 | 0 | 0 |
| 5 | BAY | 3 | 0 | 0 | 30 | ENC | 5 | 0 | 0 |
| 6 | BAY | 4 | 0 | 0 | 31 | ENC | 6 | 0 | 0 |
| 7 | BAY | 5 | 0 | 0 | 32 | ENC | 7 | 0 | 0 |
| 8 | DA | 0 | 7 | 1 | 33 | ENC | 8 | 0 | 0 |
| 9 | DA | 1 | 0 | 0 | 34 | ENC | 9 | 0 | 0 |
| 10 | DA | 2 | 0 | 0 | 35 | ENC | 10 | 0 | 0 |
| 11 | DA | 3 | 0 | 0 | 36 | ENC | 11 | 0 | 0 |
| 12 | DA | 4 | 0 | 0 | 37 | ENC | 12 | 0 | 0 |
| 13 | DA | 5 | 0 | 0 | 38 | ENC | 13 | 0 | 0 |
| 14 | DA | 6 | 0 | 0 | 39 | ENC | 14 | 0 | 0 |
| 15 | DA | 7 | 0 | 0 | 40 | ENC | 15 | 0 | 0 |
| 16 | DA | 8 | 0 | 0 | 41 | ENC | 16 | 0 | 0 |
| 17 | DA | 9 | 0 | 0 | 42 | | | | |
| 18 | DA | 10 | 0 | 0 | 43 | | | | |
| 19 | DA | 11 | 0 | 0 | 44 | | | | |
| 20 | DA | 12 | 0 | 0 | 45 | | | | |
| 21 | HA | 0 | 0 | 0 | 46 | | | | |
| 22 | HA | 1 | 0 | 0 | 47 | | | | |
| 23 | HA | 2 | 0 | 0 | 48 | | | | |
| 24 | HA | 3 | 0 | 0 | 49 | | | | |

IDENTIFYING PERFORMANCE-DEGRADING HARDWARE COMPONENTS IN COMPUTER STORAGE SYSTEMS

BACKGROUND OF THE INVENTION

The present invention relates generally to computer storage system fault diagnostics, and more particularly to identifying performance-degrading hardware components in computer storage systems.

Enterprise storage system are computer data storage systems designed for large-scale, high-technology environments of modern enterprises. In contrast to consumer storage, it has higher scalability, higher reliability, better fault tolerance, higher complexity, and a much higher initial price. As enterprise storage systems grow in size and complexity, a single input/output (I/O) operation can involve multiple hardware components and span multiple tiers of software and hardware components. Fault isolation is important in enterprise storage systems in order to decrease down time.

Enterprise storage systems can be broken down into sub-systems that include primary storage, backup storage, and archival storage. Primary storage houses data that end users are actively accessing. Backup storage stores copies of information in primary storage for use in disaster recover situations or in other circumstances where a secondary copy of data is advantageous. Archival storage stores outdated information that is advantageously stored for compliance purposes. In some enterprise storage systems, primary, secondary, and archival storage provide different qualities of service and often utilize different types of computer storage media.

SUMMARY

According to one embodiment of the present disclosure, a method for identifying performance-degrading hardware components in computer storage systems is provided. The method includes detecting, by one or more computer processors, a timed-out input/output (I/O) operation; identifying, by one or more computer processors, hardware components involved with the timed-out I/O operation, wherein the hardware components include a plurality of types of hardware components; increasing, by one or more computer processors, involve counts of the hardware components; identifying, by one or more computer processors, a plurality of suspicious hardware components based, at least in part, on a hardware hierarchy including one or more types of hardware components, wherein there is at most one suspicious hardware component for each type of hardware component; and identifying, by one or more computer processors, a performance-degrading hardware component from among the plurality of suspicious hardware components based, at least in part, on the involve counts and the hardware hierarchy, wherein the performance-degrading hardware component is in a layer of the hardware hierarchy that is lower than layers including other suspicious hardware components.

According to another embodiment of the present disclosure, a computer program product for identifying performance-degrading hardware components in computer storage systems is provided. The computer program product comprises a computer readable storage medium and program instructions stored on the computer readable storage medium. The program instructions include program instructions to detect a timed-out input/output (I/O) operation; program instructions to identify hardware components involved with the timed-out I/O operation, wherein the hardware components include a plurality of types of hardware components; program instructions to increase involve counts of the hardware components; program instructions to identify a plurality of suspicious hardware components based, at least in part, on a hardware hierarchy including one or more types of hardware components, wherein there is at most one suspicious hardware component for each type of hardware component; and program instruction to identify a performance-degrading hardware component from among the plurality of suspicious hardware components based, at least in part, on the involve counts and the hardware hierarchy, wherein the performance-degrading hardware component is in a layer of the hardware hierarchy that is lower than layers including other suspicious hardware components According to another embodiment of the present disclosure, a computer system for identifying performance-degrading hardware components in computer storage systems is provided. The computer system includes one or more computer processors, one or more computer readable storage media, and program instructions stored on the computer readable storage media for execution by at least one of the one or more processors. The program instructions include program instructions to program instructions to detect a timed-out input/output (I/O) operation; program instructions to identify hardware components involved with the timed-out I/O operation, wherein the hardware components include a plurality of types of hardware components; program instructions to increase involve counts of the hardware components; program instructions to identify a plurality of suspicious hardware components based, at least in part, on a hardware hierarchy including one or more types of hardware components, wherein there is at most one suspicious hardware component for each type of hardware component; and program instruction to identify a performance-degrading hardware component from among the plurality of suspicious hardware components based, at least in part, on the involve counts and the hardware hierarchy, wherein the performance-degrading hardware component is in a layer of the hardware hierarchy that is lower than layers including other suspicious hardware components.

DETAILED DESCRIPTION

Figure 1:
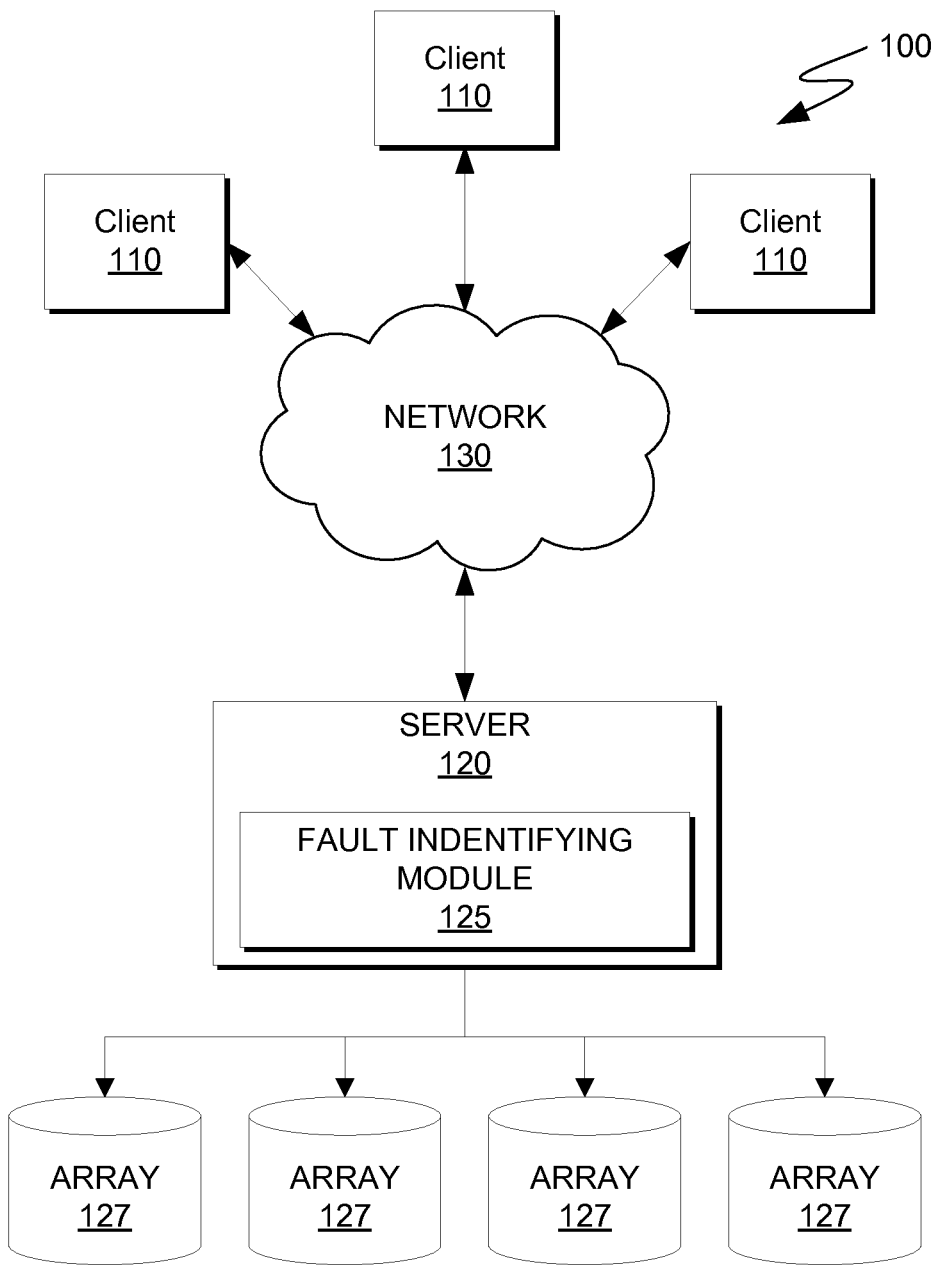
FIG. 1 is a functional block diagram illustrating a computing environment, in accordance with an embodiment of the present disclosure.

Embodiments of the present disclosure recognize a need to identify performance-degrading hardware components in enterprise storage systems. Enterprise storage systems typically include a large number of interconnected hardware components such as array controllers, bay controllers, host adapters, device adapters, and storage device controllers. A single input/output (I/O) operation can involve multiple hardware components and span multiple tiers of software and hardware components. Over a period of time, one or more of these components can degrade system performance. This can occur due to changes in workload, system misconfiguration, component failure, or some other event. System performance degradation negatively affects enterprise storage providers, for example, when I/O latencies increase, which can result in service level agreement (SLA) violations. In some cases, an increase in I/O latency of ten milliseconds can cause a transaction to timeout on the server side. It can, however, be difficult to diagnose the root cause of system performance degradation (e.g., the hardware bottleneck or faulty component). Technicians must often analyze many dump files from individual hardware components to identify faulty component(s).

Embodiments of the present disclosure also recognize a need to identify performance degrading hardware components having low utilization. In one approach for identifying performance-degrading hardware components, a utilization parameter is determined for each hardware component in a storage system. The utilization parameter of a hardware component is based on the I/O capacity and I/O load of the hardware component. Performance-degrading hardware components are identified by comparing the utilization parameter to a predetermined threshold and/or historical data. In many cases, however, hardware components degrade system performance when their utilization is not high. Consequently, in many cases, this approach is unable to identify performance-degrading hardware components.

Embodiments of the present disclosure provide a technique for identifying performance-degrading hardware components in enterprise storage systems. In some cases, the technique can identify performance-degrading hardware components having low utilization. When an I/O times outs, the hardware components that were involved with the I/O are identified. For each hardware component, a count of timed-out I/Os is maintained. When a hardware component is involved with an I/O that times-out, the count is increased by one. This count is referred to as an "involve count" herein. For hardware components of the same type, the hardware component having the highest involve count is identified and is flagged as a "suspicious component." In some situations, however, some types of hardware components do not include "suspicious components." Among the hardware components that are flagged as "suspicious components," the suspicious component having the lowest rank in a hardware hierarchy is identified as the performance-degrading component, as described herein. Accordingly, embodiments of the present disclosure provide an ability to identify specific performance-degrading hardware components, including components that are over-utilized, misconfigured, or broken. In general, the overhead of various embodiments of the present invention is low. Most of the information needed to implement the various embodiments does not impact I/O efficiencies of enterprise storage systems.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100, in which performance-degrading hardware component(s) are identified in response to one or more timed-out I/O requests. Computing environment 100 includes clients 110 and server 120. Network 130 communicatively connects clients 110 and server 120. Server 120 includes fault identifying module 125 and is communicatively connected to arrays 127.

In various embodiments, each of clients 110 is a computing device that can be a standalone device, a server, a laptop computer, a tablet computer, a netbook computer, a personal computer (PC), or a desktop computer. In some embodiments, clients 110 include a mixture of different types of computing devices. In other embodiments, one or more of clients 110 represents a computing system utilizing clustered computers and components to act as a single pool of seamless resources. In general, each of clients 110 can be any computing device or a combination of devices with access to server 120 and the ability to send I/O requests to server 120 over network 130.

In various embodiments, network 130 is a local area network (LAN), a wide area network (WAN) such as the Internet, or a combination of the two, and can include wired connections, wireless connections, fiber optic connections or other types of communicative connections. In general, network 130 can be any combination of connections and protocols that supports communication between clients 110 and server 120, in accordance with an embodiment of the present disclosure.

In various embodiments, server 120 is a computing device that can be a standalone device, a server, a laptop computer, a tablet computer, a netbook computer, a personal computer (PC), or a desktop computer. In some embodiments, server 120 represents a computing system utilizing clustered computers and components to act as a single pool of seamless resources. In general, server 120 can be any computing device or a combination of devices that stores or has access to data on arrays 127 and with access to and/or capable of executing fault identifying module 125. Server 120 can include internal and external hardware components, as depicted and described in further detail with respect to FIG. 8.

As described herein, fault identifying module 125 operates to identify performance-degrading hardware components in server 120 and/or arrays 127 in response to one or more timed-out I/Os. In the embodiment depicted in FIG. 1, data describing the logic utilized by fault identifying module 125 is stored on server 120. In other embodiments, data describing the logic utilized by fault identifying module 125 is stored on another computing device, provided that server 120 can access/execute fault identifying module 125. In yet other embodiments, data describing the logic utilized by fault identifying module 125 is stored externally and accessed through a communication network, such as network 130.

Arrays 127 are data repositories that are communicatively connected to server 120 and may be written to and read by server 120 in response to various I/O requests from clients 110. In some embodiments, network 130 or another network communicatively connects arrays 127 and server 120. Each array of arrays 127 includes one or more computer storage devices. In various embodiments, the computer storage devices are hard disk drives (HDDs), solid-state drives (SDDs), tape drives, or another type of computer storage device. In some embodiments, one or more arrays of arrays 127 includes a combination of different types of computer storage devices (e.g., a hierarchical storage system including a tier of SDDs and a tier of HDDs). In other embodiments, arrays 127 is a hierarchical storage system of two or more types of computer storage devices (e.g., a system including one or more arrays of SDDs and one or more arrays of HDDs). In various embodiments, one or more arrays of arrays 127 provide the functionality of a resilient array of independent disks (RAID), concatenated drives, spanned drives, just a bunch of disks (JBOD), a massive array of idle drives (MAID), or another resilient configuration of computer storage devices that acts as a single pool of seamless resources. The number of arrays that comprise arrays 127 is not a limitation of the present disclosure, and in some embodiments, arrays 127 includes a single array of computer storage devices.

In the embodiment depicted in FIG. 1, server 120 manages arrays 127 in response to I/O requests received from clients 110. In other embodiments, programs and entities outside of computing environment 100 send I/O requests to server 120 and/or access arrays 127 in order to populate arrays 127 with data. Persons of ordinary skill in the art will understand that I/Os in arrays 120 can be generated in various ways. FIG. 1 depicts just one example of a computing environment that generates I/Os in arrays 127. In other embodiments, different computing environments generate I/Os in arrays 127.

Figure 2:
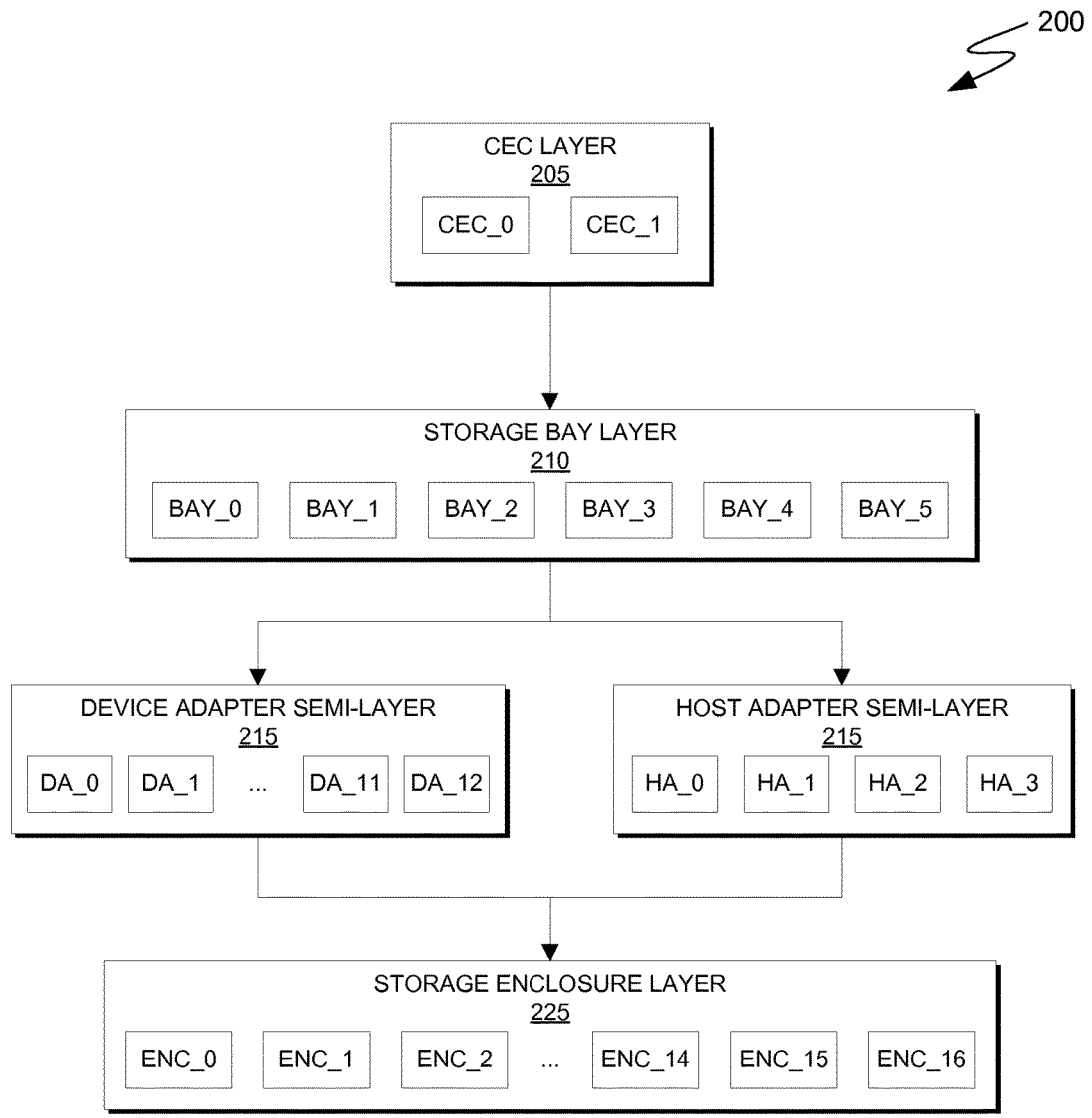
FIG. 2 is a block diagram depicting a hardware hierarchy in a computer storage system, in accordance with an embodiment of the present disclosure.

FIG. 2 is a block diagram that depicts a hardware hierarchy in a computer storage system, in accordance with an embodiment of the present disclosure. For example, hardware hierarchy 200 depicts one example of relationships between hardware components in server 120 and arrays 127. More specifically, hardware hierarchy 200 depicts relationships between a plurality of controllers (e.g., central electronic complexes (CECs)), a plurality of storage bays, a plurality of storage enclosures, and a plurality of host adapters and device adapters that connect the storage enclosures to the storage bays.

Each type of hardware component in hardware hierarchy 200 is associated with a particular layer (or semi-layer) in hardware hierarchy 200. Hardware hierarchy 200 is arranged based, at least in part, on how delays in the receipt of instructions are propagated between components. If the performance of a first type of component causes a delay in when a second type of component receives an instruction relating to an I/O, the first type of component is assigned to a higher layer in hardware hierarchy 200 than the second type of component. For example, CEC layer 205 is above bay layer 210 because the CECs manage and control access to the bays. If the performance of one of the CECs in CEC layer 205 degrades, the bays that the CEC manages will experience delays in the receipt of instructions. Similarly, storage enclosure layer 225 is below storage bay layer 210 and device adapter semi-layer 215 because latencies associated with the performance of a bay and/or a device adapter will cause one or more enclosures to experience a delay in the receipt of instructions. Persons of ordinary skill in the art will understand that hardware hierarchy 200 can be expanded to include a layer that is associated with individual computer storage devices. FIG. 2 omits such a layer for illustrative simplicity.

Figures 3, 4:
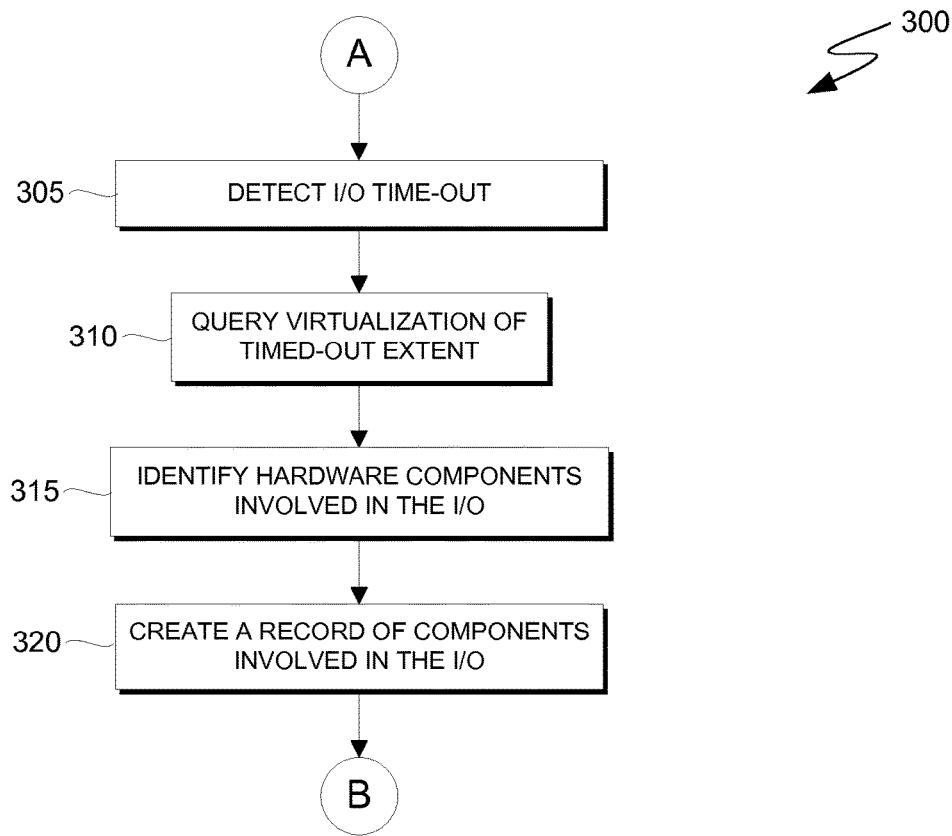
FIG. 3 is a flowchart depicting operations for, in combination with the operations depicted in FIG. 5, identifying performance-degrading hardware components in a computer storage system, in accordance with an embodiment of the present disclosure.
FIG. 4 is a table that identifies hardware components that were involved with timed-out I/Os, in accordance with an embodiment of the present disclosure.
Figure 5:
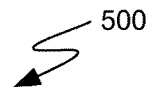
FIG. 5 is a table that lists involve counts of the hardware components depicted in FIG. 2, in accordance with an embodiment of the present disclosure.

FIG. 3 is a flowchart depicting operations for, in combination with the operations depicted in FIG. 5, identifying performance-degrading hardware components in a computer storage system, in accordance with an embodiment of the present disclosure. For example, FIG. 3 is a flowchart depicting operations 300 of fault identifying module 125, on server 120 within computing environment 100.

In operation 305, fault identifying module 125 detects an I/O time-out in a computing environment, such as the computing environment depicted in FIG. 1. In one example of a timed-out I/O, the I/O is directed to an address (e.g., an address containing data or an empty address) on an extent of a logical unit number (LUN) (i.e., a particular range of addresses in a logical storage volume). In one example of a timed-out I/O, the I/O is directed to extent 0 of LUN 0x0000. This example of a timed-out I/O and other examples of timed-out I/Os are used to describe the functionality of fault identifying module 125 as depicted in FIGS. 3 through 6.

In operation 310, fault identifying module 125 queries the virtualization information of the timed-out extent to, at least in part, determine the hardware components that were involved in the timed-out extent as described herein. In response to the query, fault identifying module 125 can receive, for example, (i) information that identifies the physical and/or logical location of the address and/or (ii) information relating to the physical access path to the address. If, for example, the timed-out I/O is directed to extent 0 of LUN 0x0000, fault identifying module 125 receives information indicating that extent 0 of LUN 0x0000 is on array 0 (e.g., one of arrays 127); that array 0 is composed of drives in ENC_0, and that ENC_0 is in BAY_0 (i.e., ENC_0 and BAY_0 as depicted in FIG. 2); and that DA_0 and DA_1 manage ENC_0.

In the embodiment depicted in FIG. 3, fault identifying module 125, in operation 315, identifies the hardware components that were involved with the timed-out I/O based, at least in part, on the result of the query of operation 310 and an I/O distribution policy. An I/O distribution policy is a set of one or more rules that determines, at least in part, how each I/O is distributed to the various hardware components of, for example, server 120, as discussed with respect to FIGS. 2 and 8. In one example of an I/O distribution policy, the rules include: a rule that odd controllers own odd volumes; a rule that even controllers own even volumes; a rule that odd controllers always uses odd device adapters; and a rule that even controllers always use even device adapters. If, in this example, the timed-out extent is extent 0 of LUN 0x0000, as discussed with respect to operation 310, fault identifying module 125 determines that CEC_0 manages LUN 0x0000 because even controllers own even volumes. Consequently, fault identifying module 125 also determines that DA_0 manages ENC_0 because even controller always use even device adapters. Based on the virtualization information of extent 0 of LUN 0x0000 and the I/O distribution policy, fault identifying module 125, identifies CEC_0, BAY_0, DA_0 and ENC_0 as the hardware components what were involved with this example of a timed-out I/O.

In some embodiments, fault identifying module 125 manages a data structure that includes records of timed-out I/Os and the hardware components that were involved with respective timed-out I/Os. Fault identifying module 125 creates these records in operation 320.

FIG. 4 is a table that identifies hardware components that were involved with timed-out I/Os, in accordance with an embodiment of the present disclosure. Table 400 is one example of a data structure that identifies the hardware components that were involved with various timed-out I/Os based, at least in part, on the functionality of fault identifying module 125, as described with respect to FIG. 3. The hardware components referenced in table 400 are components from the hardware hierarchy depicted in FIG. 2 and, in some cases, discussed with respect to FIG. 3. Each row in table 400 is associated with a timed-out I/O. In column 405, table 400 lists the extents that were referenced in the timed-out I/Os. In column 410, table 400 lists the controllers (e.g., CECs) that were involved with the timed-out I/Os, In column 415, table 400 lists the enclosures that were involved with the timed-out I/Os. In column 420, table 400 lists the device adapters that were involved with the timed-out I/Os. In column 425, table 400 lists the host adapter that were involved with the timed-out I/Os. In column 430, table 400 lists the bays that were involved with the timed-out I/Os. Accordingly, the hardware components that that were involved with a timed-out I/O can be determined from table 400 by identifying, and reading from, an appropriate row of table 400.

FIG. 5 is a table that lists involve counts of the hardware components depicted in FIG. 2, in accordance with an embodiment of the present disclosure. Table 500 is one example of a data structure that identifies various hardware components and associates an involve count with each hardware component. In the example depicted in FIG. 5, the hardware components are the hardware components referenced in FIG. 2. In some embodiments, table 500 is populated based, at least in part, on a predetermined list of hardware components. In other embodiments, fault identifying module 125 dynamically populates table 500 with hardware components when hardware components are identified in operation 315. Columns 505 and columns 510 identify the various hardware components. Columns 505 list the various types of hardware components. Columns 510 associate identifying numbers with various types of hardware components listed in columns 505. For example, table 500 represents DA_0 as "DA" in one of columns 505 and "0" in an adjacent column of columns 510. Columns 515 list the involve counts of the various hardware components. Fault identifying module 125 manages columns 515 in response to identifying hardware components in operation 315 and/or populating one or more of columns 410, 415, 420, 455, and 430 of table 400 (i.e., fault identifying module 125 increases an involve count each time a respective hardware component is involved in a timed-out I/O). Columns 520 identity suspicious components, as described herein with respect to FIG. 6.

Figure 6:
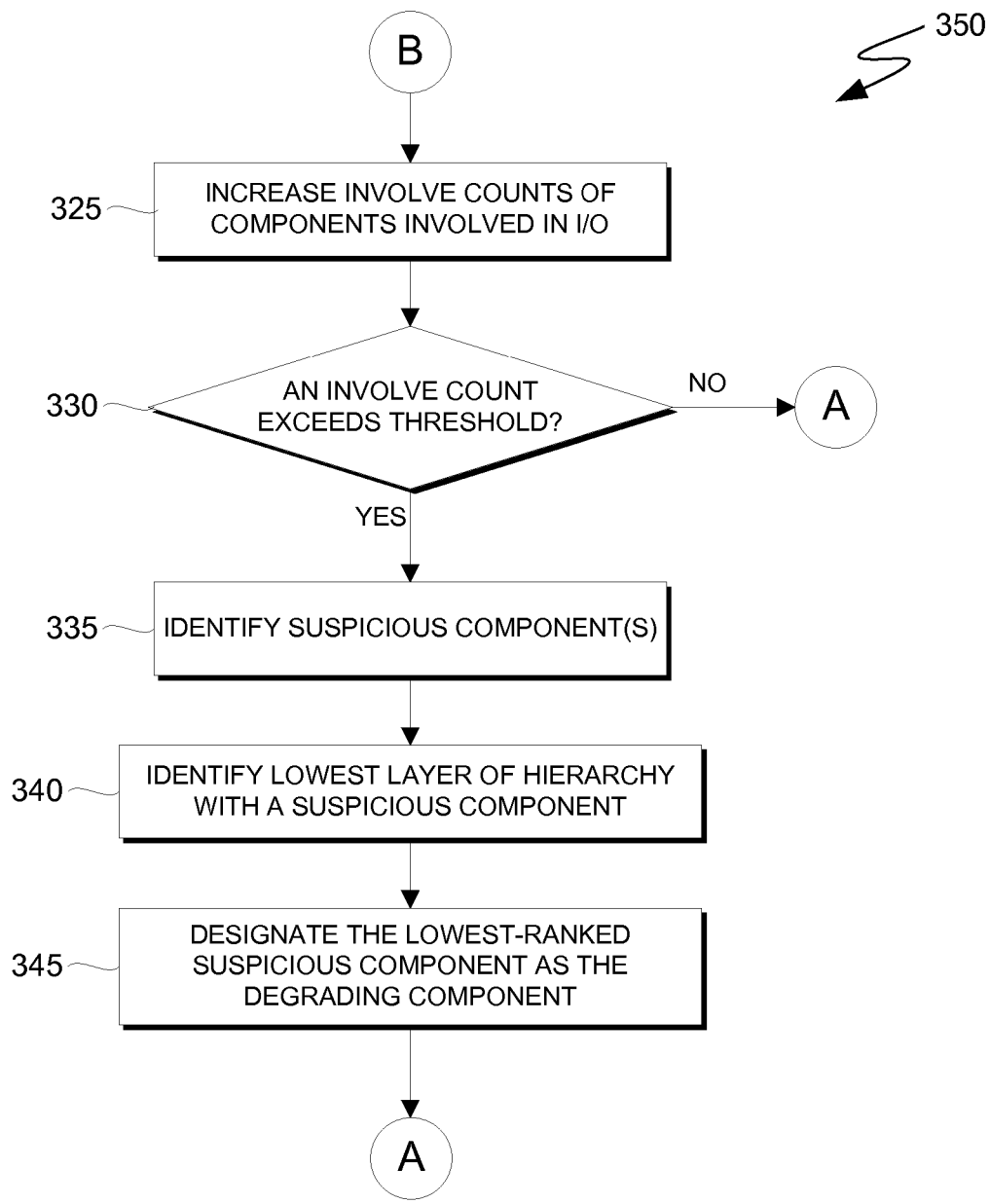
FIG. 6 is a flowchart depicting additional operations for, in combination with the operations depicted in FIG. 3, identifying performance-degrading hardware components in a computer storage system, in accordance with an embodiment of the present disclosure.

FIG. 6 is a flowchart depicting additional operations for, in combination with the operations depicted in FIG. 3, identifying performance-degrading hardware components in a computer storage system, in accordance with an embodiment of the present disclosure. For example, FIG. 3 is a flowchart depicting additional operations 350 of fault identifying module 125, on server 120 within computing environment 100.

In operation 325, fault identifying module 125 increases, by one, the involve counts of components involved in a timed-out I/O. In some embodiments, fault identifying module 125 increases the involve counts in response to identifying components in a respective row of table 400. In other embodiments, fault identifying module 125 increases the involve counts of various hardware components prior to populating table 400. Yet other embodiments omit table 400 but include table 450.

In decision 330, fault identifying module 125 determines whether or not an involve count exceeds a threshold of a first threshold type. In some embodiments, fault identifying module 125 determines, in decision 330, whether or not an involve count of any hardware component of any type exceeds a threshold of a first threshold type (e.g., any involve count in table 500). In other embodiments, fault identifying module 125 determines, in decision 330, whether the involve count of a hardware component of a specific type exceeds a threshold of a first threshold type (e.g., an involve count of any of the enclosures listed in table 500) and performs decision 330 for each type of hardware component. In such embodiments, different types of hardware components can have different thresholds of the first threshold type. If fault identifying module 125 determines that an involve count exceeds a threshold of a first threshold type (decision 330, YES branch), fault identifying module 125 performs operation 335. If fault identifying module 125 determines that an involve count does not exceed a threshold of the first threshold type (decision 330, NO branch), fault identifying module 125 waits for the conditions of operation 305 to occur and, in response, performs operation 305.

In operation 335, fault identifying module 125 identifies one or more suspicious components. In FIG. 5, for example, fault identifying module 125 identified CEC_0 (having an involve count of seven), BAY_0 (having an involve count of seven), and DA_0 (having an involve count of seven) as suspicious components. In the embodiment depicted in FIG. 5, only one hardware component of each type is identified as suspicious. In some embodiments, the hardware component having the highest involve count among hardware components of the same type is identified as the suspicious components. In other embodiments, a hardware component having an involve count that is (i) greater than a threshold of a second threshold type and (ii) the highest involve count among the hardware components of the same type is identified as a suspicious component. In such embodiments, threshold(s) of the second threshold type can be selected to, at least in part, minimize the occurrence of false positives (e.g., where a hardware component is mistakenly designated as a performance-degrading component). In some embodiments, thresholds of the second threshold type are different for different types of hardware components.

In some embodiments, like the embodiment depicted in FIG. 5, fault identifying module 125 does not identify a suspicious component among hardware components of the same type and having involve counts greater than zero if the involve counts are sufficiently similar (e.g., no enclosures are identified as suspicious in FIG. 5 even though ENC_0, ENC_1, ENC_2, and ENC_3 have involve counts greater than zero). In one example of such an embodiment, fault identifying module 125 determines if the difference between the involve counts of any two hardware components of the same type is greater than a threshold of a third threshold type. If the difference is greater than (or in some embodiments, equal to) a threshold of the third threshold type, the hardware component having the highest involve count is identified as the suspicious component. If the difference is less than (or in some embodiments, equal to) a threshold of a third threshold type, no hardware component of the type is identified as a suspicious component. In FIG. 5, the greatest difference in involve counts of the enclosures is only two, and no enclosure is identified as a suspicious component. Threshold(s) of the third threshold type can be selected to, at least in part, minimize the occurrence of false positives (e.g., where a hardware component is mistakenly designated as a performance-degrading component). Persons of ordinary skill in the art will understand, upon viewing FIG. 5 and reading the present disclosure, that designating ENC_2 as a suspicious component would result in a false positive in this example because DA_0 is in the next highest layer of the hardware hierarchy and is involved with a significant number of timed-out I/Os regardless of the enclosures involved in the I/Os. In some embodiments, thresholds of the third threshold type are different for different types of hardware components.

In operation 340, fault identifying module 125 identifies the suspicious component in the lowest layer of a hardware hierarchy, such as the hardware hierarchy depicted in FIG. 2.

In operation 345, fault identifying module 125 designates the lowest-ranked suspicious component as the performance-degrading component. After designating a hardware component as the performance-degrading component, fault identifying module 125 waits for the conditions of operation 305 to occur and, in response, performs operation 305. Accordingly, fault identifying module 125 can, in some embodiments, designate a different and/or an additional hardware component of a different type as a performance-degrading component based, at least in part, on subsequent timed-out I/Os.

Figure 7:
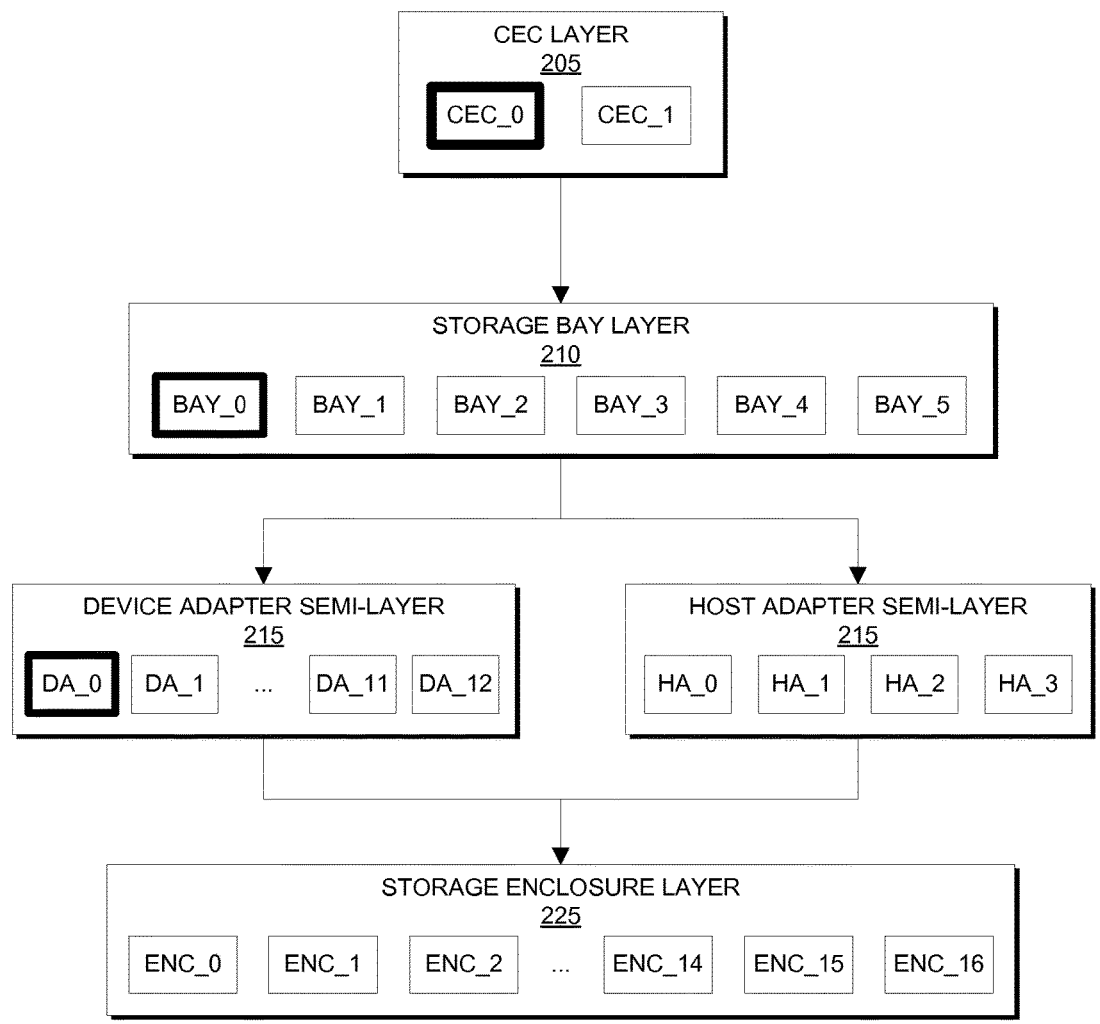
FIG. 7 is a block diagram that identifies suspicious components in a hardware hierarchy based on the involve counts listed in FIG. 6, in accordance with an embodiment of the present disclosure.

FIG. 7 is a block diagram that identifies suspicious components in a hardware hierarchy based on the involve counts listed in FIG. 5, in accordance with an embodiment of the present disclosure. In FIG. 7, suspicious components (e.g., CEC_0, BAY_0, and DA_0) are identifiable by more heavily weighted borders. As shown in FIG. 7, DA_0 is the lowest-ranked suspicious component. Accordingly, fault identifying module 125 designates DA_0 as the performance-degrading component in the embodiment depicted in FIG. 7.

Figure 8:
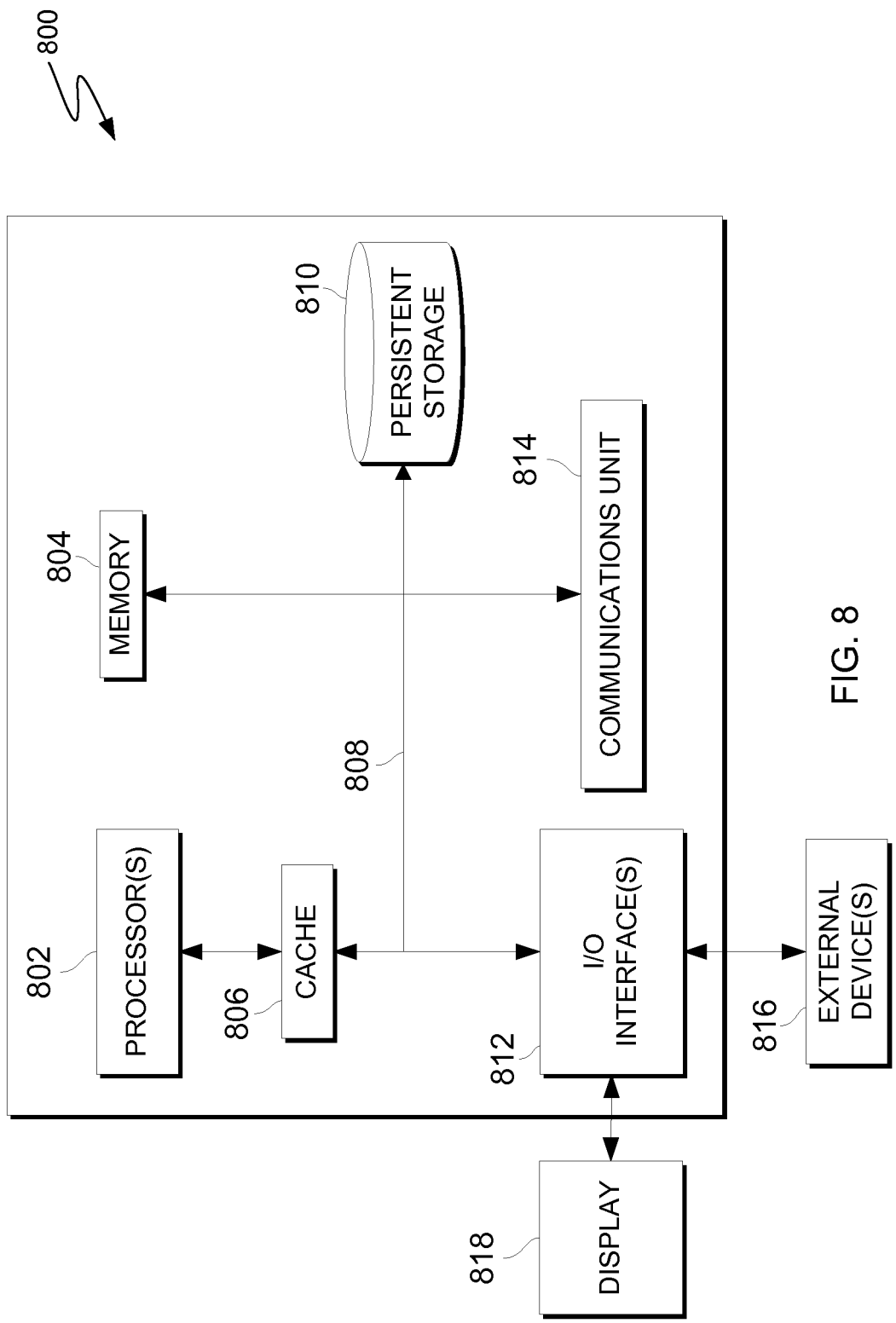
FIG. 8 is a functional block diagram that depicts a computer system, in accordance with an embodiment of the present disclosure.

FIG. 8 in a functional block diagram that depicts a computer system, in accordance with an embodiment of the present disclosure. Computer system 800 is an example of a computer system that executes fault identifying module 125, as described herein. Computer system 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data and data near accessed data from memory 806.

Program instructions and data used to practice embodiments of the present invention may be stored in persistent storage 808 for execution by one or more of the respective processors 804 via cache 816 and one or more memories of memory 806. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to each computer system. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
  detecting, by one or more computer processors, a timed-out input/output (I/O) operation;
  identifying, by the one or more computer processors, each hardware component of a plurality of hardware components involved with the timed-out I/O operation, wherein the hardware components include a plurality of types of hardware components;
  increasing, by the one or more computer processors, involve counts of each of the identified hardware components;
  identifying, by one or more computer processors, a plurality of suspicious hardware components based, at least in part, on a hardware hierarchy including one or more of the types of hardware components, wherein:
    the hardware hierarchy specifies a ranking of suspicious hardware components of different types of hardware components based, at least in part, on subsequently identified timed-out I/O operations;
each type of hardware component represents a respective hierarchical level of the hardware hierarchy based, at least in part, on how delays in receipt of instructions are propagated between the plurality of types of hardware components,
each hierarchical level of the hardware hierarchy includes no more than one suspicious hardware component, and
a suspicious component is a hardware component having a highest involve count within the respective hierarchical level of the hardware hierarchy; and
identifying, by the one or more computer processors, a performance-degrading hardware component from among the plurality of suspicious hardware components based, at least in part, on the involve counts and the hardware hierarchy, wherein the performance-degrading hardware component is in a layer of the hardware hierarchy that is lower than all other layers that include suspicious hardware components.

2. The method of claim 1, further comprising:
determining, by the one or more computer processors, that an involve-count exceeds a threshold of a first threshold type and, in response, identifying the plurality of suspicious hardware components.

3. The method of claim 1, wherein a suspicious hardware component is a hardware component that has an involve count that is higher than involve counts of all other hardware components of a same type.

4. The method of claim 1, further comprising:
determining, by the one or more computer processors, that no involve counts of hardware components of a same type exceed a threshold of a second threshold type and, in response, identifying no suspicious hardware component from among the hardware components of the same type.

5. The method of claim 1, further comprising:
determining, by the one or more computer processors, that a difference between involve counts of any two hardware components of a same type does not exceed a threshold of a third threshold type and, in response, identifying no suspicious hardware component from among hardware components of the same type.

6. The method of claim 1, wherein a first layer in the hardware hierarchy includes a first type of hardware component and a second layer in the hardware hierarchy includes a second type of hardware component, and wherein the first layer is lower than the second layer due, at least in part, to delays in receipt of instructions that are propagated from the second type of hardware component to the first type of hardware component.

7. The method of claim 1, wherein the hardware components involved with the timed-out I/O operation are identified based, at least in part, on an I/O distribution policy.

8. A computer program product comprising:
a computer readable storage device and program instructions stored on the computer readable storage device, the program instructions comprising:
program instructions to detect a timed-out input/output (I/O) operation;
program instructions to identify each hardware component of a plurality of hardware component involved with the timed-out I/O operation, wherein the hardware components include a plurality of types of hardware components;
program instructions to increase involve counts of each of the identified hardware components;
program instructions to identify a plurality of suspicious hardware components based, at least in part, on a hardware hierarchy including one or more of the types of hardware components, wherein:
the hardware hierarchy specifies a ranking of suspicious hardware components of different types of hardware components based, at least in part, on subsequently identified timed-out I/O operations;
each type of hardware component represents a respective hierarchical level of the hardware hierarchy based, at least in part, on how delays in receipt of instructions are propagated between the plurality of types of hardware components,
each hierarchical level of the hardware hierarchy includes no more than one suspicious hardware component, and
a suspicious component is a hardware component having a highest involve count within the respective hierarchical level of the hardware hierarchy; and
program instruction to identify a performance-degrading hardware component from among the plurality of suspicious hardware components based, at least in part, on the involve counts and the hardware hierarchy, wherein the performance-degrading hardware component is in a layer of the hardware hierarchy that is lower than all other layers that include suspicious hardware components.

9. The computer program product of claim 8, the program instructions further comprising:
program instructions to determine that an involve-count exceeds a threshold of a first threshold type and, in response, identify the plurality of suspicious hardware components.

10. The computer program product of claim 8, wherein a suspicious hardware component is a hardware component that has an involve count that is higher than involve counts of all other hardware components of a same type.

11. The computer program product of claim 8, the program instructions further comprising:
program instructions to determine that no involve counts of hardware components of a same type exceed a threshold of a second threshold type and, in response, identifying no suspicious hardware component from among the hardware components of the same type.

12. The computer program product of claim 8, the program instructions further comprising:
program instruction to determine that a difference between involve counts of any two hardware components of a same type does not exceed a threshold of a third threshold type and, in response, identifying no suspicious hardware component from among hardware components of the same type.

13. The computer program product of claim 8, wherein a first layer in the hardware hierarchy includes a first type of hardware component and a second layer in the hardware hierarchy includes a second type of hardware component, and wherein the first layer is lower than the second layer due, at least in part, to delays in receipt of instructions that are propagated from the second type of hardware component to the first type of hardware component.

14. The computer program product of claim 8, wherein the hardware components involved with the timed-out I/O operation are identified based, at least in part, on an I/O distribution policy.

15. A computer system comprising:
one or more computer processors;
one or more computer readable storage devices;
program instructions stored on the computer readable storage devices for execution by at least one of the one or more processors, the program instructions comprising:
  program instructions to detect a timed-out input/output (I/O) operation;
  program instructions to identify each hardware component of a plurality of hardware components involved with the timed-out I/O operation, wherein the hardware components include a plurality of types of hardware components;
  program instructions to increase involve counts of each of the identified hardware components;
  program instructions to identify a plurality of suspicious hardware components based, at least in part, on a hardware hierarchy including one or more of the types of hardware components, wherein:
    the hardware hierarchy specifies a ranking of suspicious hardware components of different types of hardware components based, at least in part, on subsequently identified timed-out I/O operations;
    each type of hardware component represents a respective hierarchical level of the hardware hierarchy based, at least in part, on how delays in receipt of instructions are propagated between the plurality of types of hardware components,
    each hierarchical level of the hardware hierarchy includes no more than one suspicious hardware component, and
    a suspicious component is a hardware component having a highest involve count within the respective hierarchical level of the hardware hierarchy; and
  program instruction to identify a performance-degrading hardware component from among the plurality of suspicious hardware components based, at least in part, on the involve counts and the hardware hierarchy, wherein the performance-degrading hardware component is in a layer of the hardware hierarchy that is lower than all other layers that include suspicious hardware components.

16. The computer system of claim 15, the program instructions further comprising:
  program instructions to determine that an involve-count exceeds a threshold of a first threshold type and, in response, identify the plurality of suspicious hardware components.

17. The computer system of claim 15, wherein a suspicious hardware component is a hardware component that has an involve count that is higher than involve counts of all other hardware components of a same type.

18. The computer system of claim 15, the program instructions further comprising:
  program instructions to determine that no involve counts of hardware components of a same type exceed a threshold of a second threshold type and, in response, identifying no suspicious hardware component from among the hardware components of the same type.

19. The computer system of claim 15, the program instructions further comprising:
  program instruction to determine that a difference between involve counts of any two hardware components of a same type does not exceed a threshold of a third threshold type and, in response, identifying no suspicious hardware component from among hardware components of the same type.

20. The computer system of claim 15, wherein a first layer in the hardware hierarchy includes a first type of hardware component and a second layer in the hardware hierarchy includes a second type of hardware component, and wherein the first layer is lower than the second layer due, at least in part, to delays in receipt of instructions that are propagated from the second type of hardware component to the first type of hardware component.

* * * * *